United States Patent [19]
Almquist et al.

[11] Patent Number: 5,553,144
[45] Date of Patent: Sep. 3, 1996

[54] METHOD AND SYSTEM FOR SELECTIVELY ALTERING DATA PROCESSING SYSTEM FUNCTIONAL CHARACTERISTICS WITHOUT MECHANICAL MANIPULATION

[75] Inventors: Frank A. Almquist, Kingston; David F. Anderson, LaGrangeville; John E. Campbell, Hurley; Michael J. Chan, Kingston; Stephen W. Flaherty, Fishkill; Steven F. Hajek, West Hurley; John F. Larsen, Kingston; Charles H. Milligan, Hopewell Junction; Cyril A. Price, Stone Ridge; Andrew M. Simon, Hopewell Junction; William F. Washburn, Hyde Park; George A. Williams, II, Lake Katrine; Roy A. Wood, Saugerties, all of N.Y.

[73] Assignee: International Business Machines Corporation, Armonk, N.Y.

[21] Appl. No.: 439,934

[22] Filed: Mar. 7, 1995

Related U.S. Application Data

[63] Continuation of Ser. No. 29,856, Mar. 11, 1993, abandoned.

[51] Int. Cl.⁶ .................. H04L 9/00; H04L 9/32
[52] U.S. Cl. ............... 380/25; 380/4; 380/23; 380/49; 380/50; 340/825.31; 340/825.34
[58] Field of Search ................. 380/4, 23, 25, 380/49, 50, 59; 340/825.31, 825.34

[56] References Cited

U.S. PATENT DOCUMENTS

| | | | |
|---|---|---|---|
| 3,245,045 | 4/1966 | Randley | 395/275 |
| 4,100,534 | 7/1978 | Shifflet, Jr. | 340/825.31 |
| 4,471,379 | 9/1984 | Stephens | 380/15 |
| 4,494,114 | 1/1985 | Kaish | 340/825.31 |
| 4,532,507 | 7/1985 | Edson et al. | 340/825.31 |
| 4,572,224 | 3/1986 | Ost | 380/20 |
| 4,712,238 | 12/1987 | Gilhousen et al. | 380/20 |
| 4,759,062 | 7/1988 | Traub et al. | 380/25 |
| 4,799,258 | 1/1989 | Davies | 380/21 |
| 4,849,927 | 7/1989 | Vos | 235/382.5 |
| 5,014,312 | 5/1991 | Lisimaque et al. | 380/25 |

*Primary Examiner*—Bernarr E. Gregory
*Attorney, Agent, or Firm*—Whitham, Curtis, Whitman & McGinn; Lynn L. Augspurger

[57] ABSTRACT

A method and system are disclosed for selectively altering the functional characteristics of a data processing system without physical or mechanical manipulation. A data processing system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolatile memory into a nonscannable register within a secure portion of a control logic circuit each time power is applied to the data processing system and the definition is then utilized to enable only selected functional characteristics. Alternate functional characteristics may thereafter be selectively enabled by entering a security code which matches one of a number of preloaded codes and an encoded alternate functional characteristic definition. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

14 Claims, 7 Drawing Sheets

METHOD AND SYSTEM FOR SELECTIVELY ALTERING DATA PROCESSING SYSTEM FUNCTIONAL CHARACTERISTICS WITHOUT MECHANICAL MANIPULATION

This is a Continuation of appln. Ser. No. 08/029,856 filed Mar. 11, 1993, now abandoned.

BACKGROUND OF THE INVENTION

1. Technical Field

The present invention relates in general to an improved data processing system, and in particular to a method and system for selectively modifying the functional characteristics of a data processing system. Still more particularly, the present invention relates to a method and system for permitting the functional characteristics of a data processing system to be selectively altered without the necessity of physical or mechanical manipulation.

2. Description of the Related Art

In the modern world the computer has become increasingly ubiquitous. From relatively simple so-called "personal" computers to large mainframe and super computers, the number and variety of computers has increased in recent years at an astounding rate. While the multiple models, variations and capabilities of modern computers represent a wide variety of choices to the consumer, the concomitant requirement that multiple variations and models of such computers be manufactured and stocked represents a substantial burden to computer manufacturers.

Each existing model, variable functional characteristic or capability of a computer represents a large number of different systems, subassemblies and components which must be manufactured and stocked to maintain customer satisfaction. Thus, it should be apparent that greater economy and efficiency may be obtained by computer manufacturers by minimizing the number of such variations offered. However, customers expect and demand a large variety of computer systems for multiple different applications. In view of the above, a method and system which permits a wide variety of functional characteristics to be implemented within a single computer system would be highly advantageous. Further, variations in functional characteristics within such a computer system would ideally be accomplished without the necessity of physical or mechanical manipulation.

Many methods exist for granting or revoking a user's access to selected facilities or files within a data processing system. These techniques often utilize a secret "key" or "password" entered by a user and recognized within the data processing system as an indication of the user's ability to read, write, delete, copy or append a selected record. One example of such a system is disclosed in U.S. Pat. No. 4,799,258.

Further, several known techniques exist for storing such "keys," "passwords" or other secure data within secure storage devices within a data processing system. For example, U.S. Pat. No. 4,949,927 discloses a method for providing a security module for physically protecting such sensitive data. Similarly, U.S. Pat. No. 4,759,062 discloses a method for protecting sensitive data, such as private security codes.

Each of the methods described above permits the storage and utilization of sensitive or private data; however, none of these publications teaches a technique whereby the functional characteristics of a data processing system may be selectively altered. Systems do exist for enabling or disabling electronic equipment utilizing "keys" or other similar devices. Primarily such systems are directed to enabling or disabling reception of television or CATV signals within a television receiver. For example, see U.S. Pat. Nos. 4,577,224 and 4,471,379.

In summary, many systems exist which permit selected users to access and manipulate particular files within a data processing system or which enable or disable a selected electronic system; however, no known systems exist which permit the functional characteristics of a data processing system to be selectively modified without the necessity of physical or mechanical manipulation.

SUMMARY OF THE INVENTION

It is therefore one object of the present invention to provide an improved data processing system.

It is another object of the present invention to provide a method and system for selectively modifying the functional characteristics of as data processing system.

It is still another object of the present invention to provide a method and system for permitting the functional characteristics of a data processing system to be selectively altered without the necessity of physical or mechanical manipulation.

The foregoing objects are achieved as is now described. The method and system of the present invention may be utilized to selectively alter the functional characteristics of a data processing system without physical or mechanical manipulation. A data processing system is first manufactured having a predetermined set of functional characteristics. A multibit alterable code which includes a functional characteristic definition is then initially loaded into physically secure, nonvolatile memory within the data processing system, utilizing an existing bus, or a fusible link which may be opened after loading is complete. The functional characteristic definition is loaded from nonvolatile memory into a nonscannable register within a secure portion of a control logic circuit each time power is applied to the data processing system and the definition is then utilized to enable only selected functional characteristics. Alternate functional characteristics may thereafter be selectively enabled by entering a security code which matches one of a number of preloaded codes and an encoded alternate functional characteristic definition. The alternate functional characteristic definition may be enabled on a one-time, metered, or regularly scheduled basis and variable capability data processing systems may be implemented in this manner utilizing a single manufactured system, without the necessity of manufacturing and storing multiple data processing system models.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
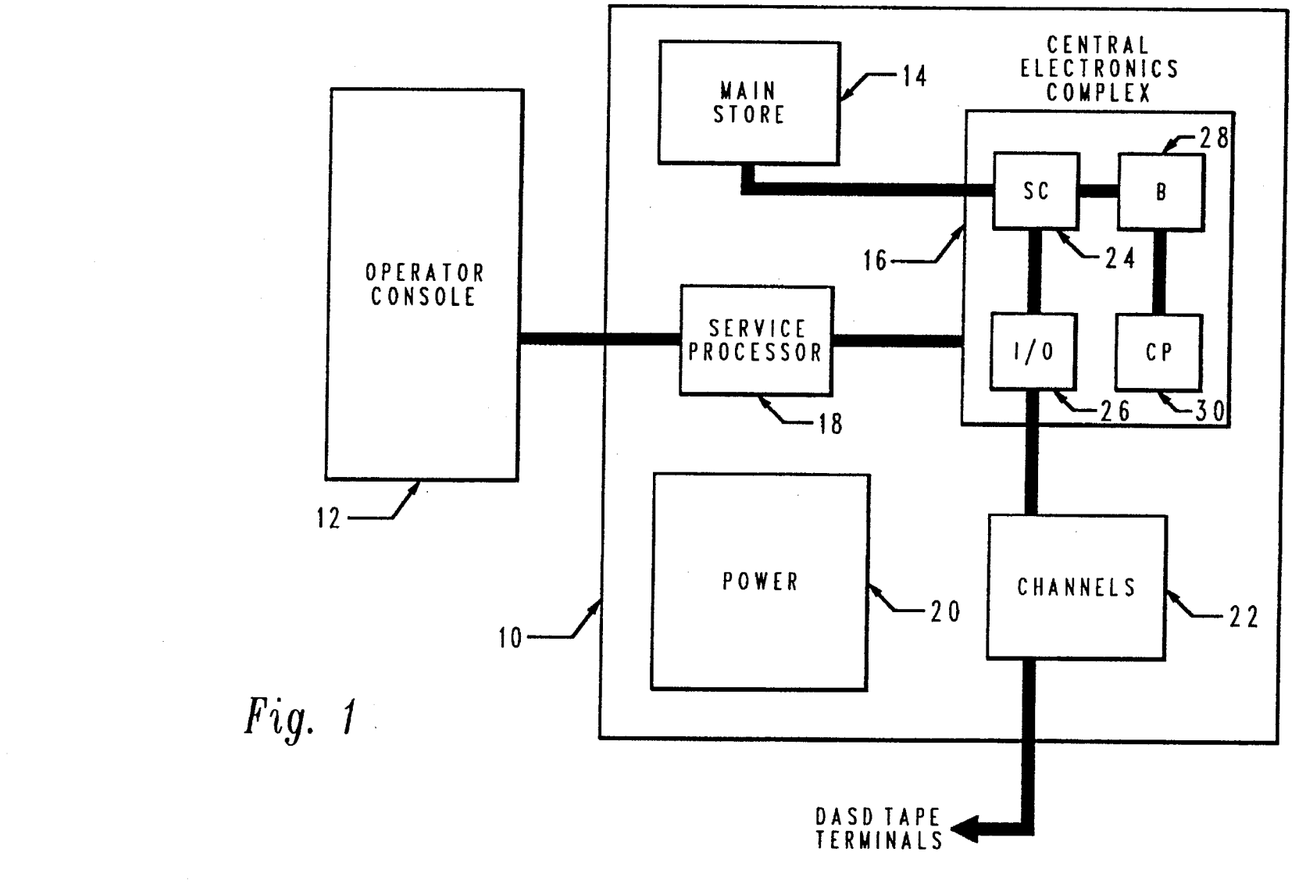
FIG. 1 is a high level block diagram of a data processing system which may be utilized to implement the method and system of the present invention.

With reference now to the figures and in particular with reference to FIG. 1, there is depicted a high level block diagram of a data processing system which may be utilized to implement the method and system of the present invention. As illustrated, the data processing system includes a computer 10 which is coupled to an operator console 12 in a manner well known in the art. Many of the high level components within computer 10 are depicted within FIG. 1, including main store 14, which serves as the main electronic storage within computer 10, and a central electronics complex 16 is also depicted. As will be explained in greater detail herein, central electronics complex 16 may include multiple multichip modules which serve to perform the various functions of the central electronic complex, or alternately, central electronics complex 16 may be provided with a single high density circuit and including integrated circuit devices equivalent to several million transistors.

A service processor 18 is provided and is preferably coupled between operator console 12 and central electronics complex 16 to provide access to the functions and circuitry therein. A power supply 20 and input/output channels 22 are also typically provided in such a computer system, as those skilled in the art will appreciate. Input/output channels 22 are preferably utilized to access various direct access storage devices (DASD), such as diskette or tape storage devices, or printers, terminals or similar devices.

Still referring to FIG. 1, the high level segments of central electronics complex 16 are illustrated. In a modern mainframe computer such as the International Business Machines Corporation System/390 the central electronics complex typically includes four or more multichip modules which serve to address various functions within a central electronics complex. As illustrated within FIG. 1, central electronics complex 16 includes an SC module 24 which preferably serves to buffer and control the flow of data between main store 14, input/output module 26 and the various processors within computer 10. Input/output module 26 preferably serves to control and buffer data between input/output channels 22 and main store 14 in a manner well known in the art. Similarly, B module 28 is provided to buffer and control instructions and data for the processor and CP module 30 serves to execute instructions within computer 10. As those skilled in the art will appreciate, each of these multichip modules 24, 26, 28 and 30 constitutes a highly complex electronic module which may include more than one hundred integrated circuit devices, each equivalent to thousands or millions of transistors.

Figure 2:
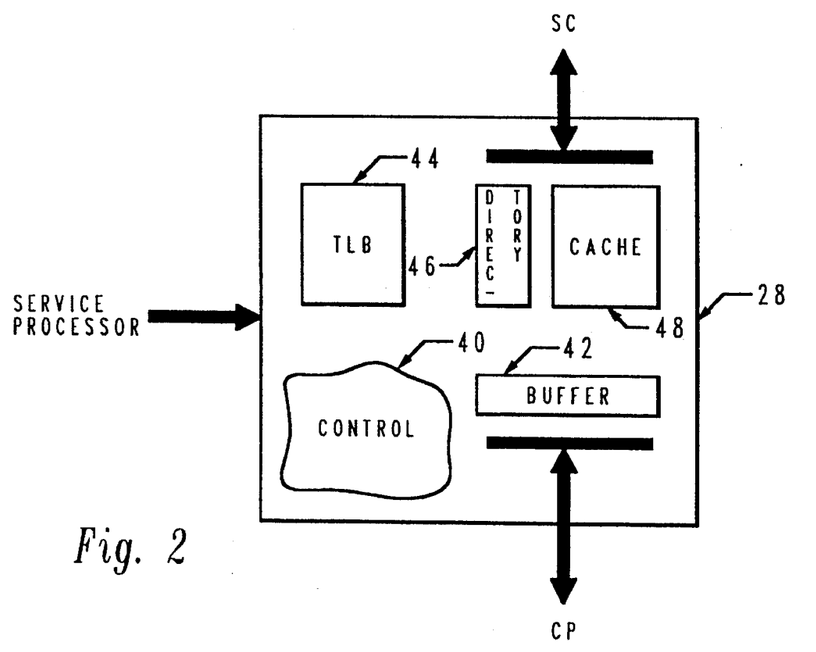
FIG. 2 is a high level schematic representation of one multichip module from the central electronic complex of the data processing system of FIG. 1.

With reference now to FIG. 2, there is depicted a high level schematic representation of one multichip module from central electronics complex 16 of FIG. 1. As illustrated, B module 28 is illustrated along with several of its high level components. For example, a large portion of B module 28 is depicted generally at reference numeral 40, which represents the various control functions implemented within this multichip module. A buffer 42 is preferably provided to buffer instructions and data from CP module 30 and a directory 46 and cache 48 are also typically provided to buffer and control data between B module 28 and SC module 24.

Additionally, as those skilled in this art will appreciate, a translation lookaside buffer (TLB) 44 is also provided and is utilized, in a manner well known in the art, to translate virtual memory addresses into real memory addresses within main store or other locations within computer 10.

Thus, it should be apparent that the functional characteristics of computer 10 may be altered and controlled by varying the capabilities and circuitry of B module 28; however, the complexity required to manufacture and maintain multiple varieties of B module 28 would be greatly diminished if the functional characteristics associated with this multichip module might be electronically manipulated.

Figure 3:
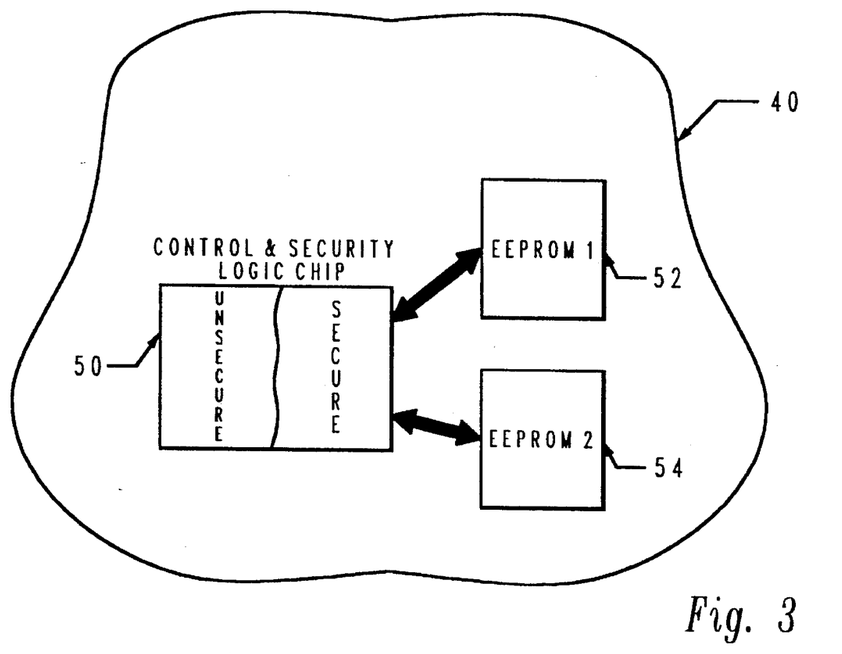
FIG. 3 is a high level schematic representation of the control and security logic circuitry which may be utilized within the multichip module of FIG. 2 to implement the method and system of the present invention.

With reference now to FIG. 3 there is depicted a high level schematic representation of a portion of the control and security logic circuitry which may be utilized within B module 28 of FIG. 2. As illustrated, control circuitry 40 may be constructed including a control and security logic chip 50 which is coupled to multiple nonvolatile memory storage devices, such as EEPROM 52 and EEPROM 54. In the depicted embodiment of the present invention control and security logic chip 50 preferably includes both an unsecure and a secure portion. In a manner which will be described in greater detail herein, a personality register may be established within the secure portion of control and security logic chip 50 and utilized to store data which has been retrieved from EEPROM 52 and/or EEPROM 54 to selectively alter the functional characteristics of computer 10.

Figure 4:
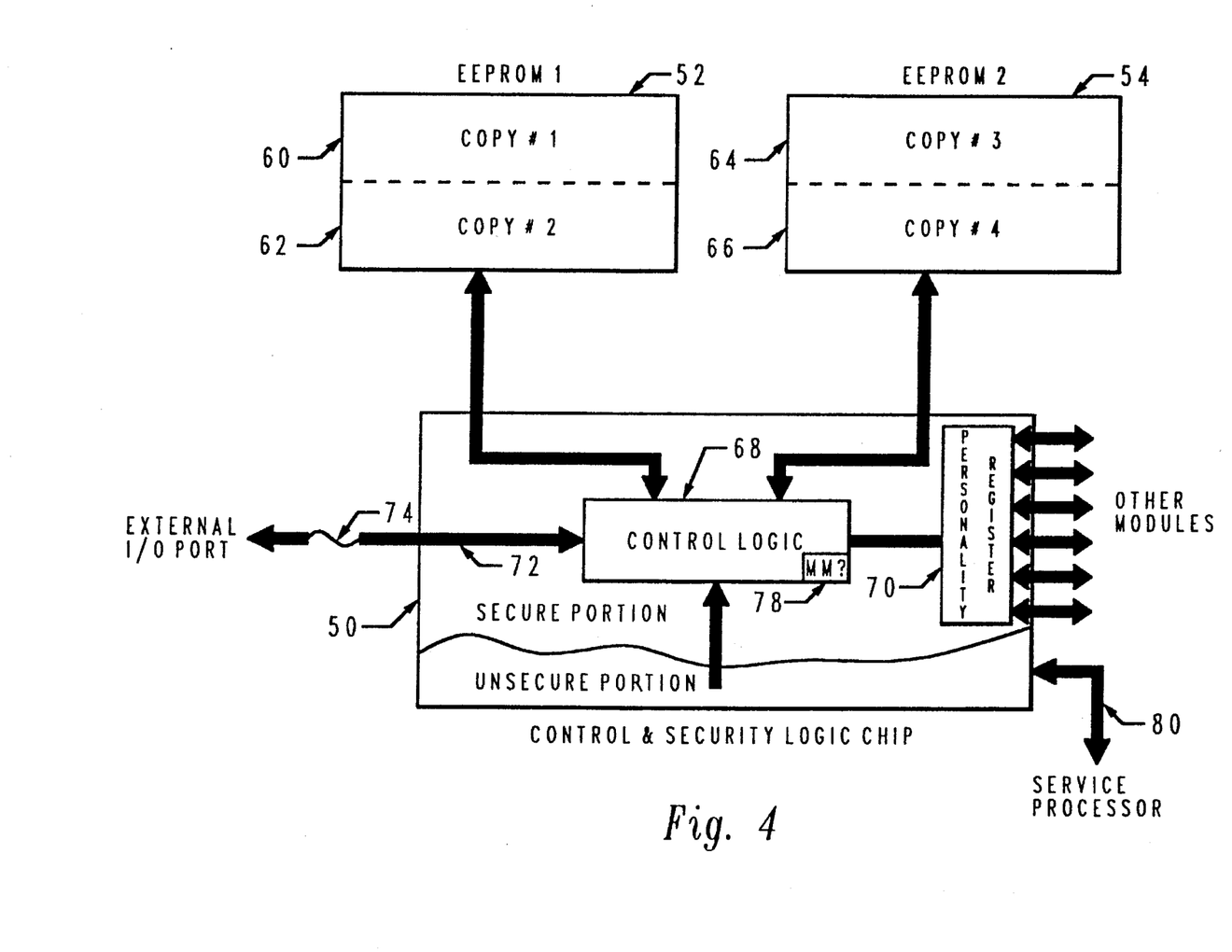
FIG. 4 is a more detailed schematic representation of the control and logic circuitry of FIG. 3.

Referring now to FIG. 4, there is depicted a more detailed schematic representation of the control and logic circuitry of FIG. 3. As illustrated, control and security logic chip 50 includes both an unsecure portion and a secure portion. Within the secure portion of control and security logic chip 50 control logic 68 are provided. Control logic 68 is preferably coupled to both EEPROM 52 and EEPROM 54 which contain, in a manner which will be explained in greater detail herein, various multibit alterable codes which may be utilized to selectively alter the functional characteristics of computer 10. In the depicted embodiment of the present invention, multiple copies of this multibit alterable code are provided within multiple nonvolatile storage devices in order to minimize the possibility of disruption due to failure. As illustrated, EEPROM 52 includes two identical copies of the multibit alterable code, which may be utilized to selectively control the functional characteristics of computer 10. Similarly, two additional identical copies of this code are contained within EEPROM 54.

In the depicted embodiment of the present invention, each multibit alterable code includes various fields of data. For example, a model number field may be provided and utilized to store an identification of the model number of computer 10. Additionally, in the illustrated embodiment of the present invention, multiple unique identification codes are also provided. In one implementation of the present invention, six different fifty-six bit identification codes are provided within each copy of the multibit alterable code contained within EEPROM 52 and EEPROM 54. These unique identification codes will be utilized in a manner which will be explained in greater detail below. Additionally, selected "personality" data is also present within each copy of the multibit alterable code within EEPROM 52 and EEPROM 54, which may be utilized to specify the selected functional characteristics of computer 10.

As those skilled in the art will appreciate, mainframe computers such as the International Business Machines Corporation System/390 may include multiple levels of functional capability which may be provided by varying the range of memory that may be accessed within a particular computer system, the number or percentage of processors which are enabled within a particular computer, the amount of usable cache memory within a particular computer and the processor speed and/or capability provided within a particular computer. Thus, by providing computer 10 with the capability of all of these functional characteristics during the manufacturing process a selected subset or variations of those functional characteristics may be enabled utilizing the method and system of the present invention.

In a manner which will be illustrated below, the initial loading of the multiple copies of the multibit alterable code within EEPROM 52 and EEPROM 54 may be accomplished utilizing several different techniques. For example, an external I/O port 72 is provided and may be utilized to directly load multiple copies of the multibit alterable code into EEPROM 52 and EEPROM 54 during the manufacturing process. Thereafter, a fusible link, such as fusible link 74, may be opened, prohibiting the loading of altered multibit codes utilizing the external I/O port 72. Alternately, the initial loading of the multibit alterable code or variations thereto may be accomplished utilizing the service processor, via bus 80, through the unsecure portion of control and security logic chip 50. As will be explained in greater detail herein, this may be accomplished by requiring a user to enter codes matching two of the six unique identification codes contained within each copy of the multibit alterable code and thereafter setting a manufacturing mode (MM) bit 78 within control logic 68. When this bit is set, control logic 68 will permit alterations to the multibit alterable code within EEPROM 52 and EEPROM 54 to be accomplished.

As set forth above, external I/O port 72, in conjunction with fusible link 74, may be utilized to permit access to secure logic for manufacturing tests, as well as initialization of "blank" EEPROMs mounted within a multichip module. The provision of external I/O port 72 and fusible link 74 is typically required due to the fact that EEPROMs which are initialized prior to mounting within a multichip module often lose their initial values during the manufacturing process. Additionally, exhaustive testing of the secure logic is typically required in order to assure proper operation of the data processing system. Thus, there are, in accordance with the depicted embodiment of the present invention, three methods for initializing the EEPROMs. Firstly, external I/O port 72 and fusible link 74 may be utilized in a system to initialize the nonvolatile storage by means of a service processor. Secondly, external I/O port 72 and fusible link 74 may be utilized in a test bed via scan or via EEPROM redriven logic through the logic circuitry, and third, the EEPROMs may be initialized by presetting the manufacturing mode (MM) bit 78 during the manufacturing process.

Having loaded multiple copies of a multibit alterable code within EEPROM 52 and EEPROM 54 within computer 10, control logic 68 then obtains the so-called "personality" data from one copy of the multibit alterable code and loads that information into a nonscannable personality register 70 within the secure portion of control and security logic chip 50. Personality register 70 is preferably utilized to maintain the current personality data stored within the multibit alterable code in a manner such that other modules or chips within computer 10 may access that information and determine whether or not selected functional characteristics within computer 10 are enabled and presently being utilized.

The schematic representation within FIG. 4 is a relatively high level representation and those skilled in the art will appreciate that additional control logic circuitry may also be utilized. For example, a status register is preferably provided which is utilized to store the number of access attempts which have occurred since a successful loading or alteration of the multibit alterable code. In a manner well known to those having skill in the security data art, the number of such attempts may be limited to a relatively small number of attempted accesses and an attempted access or alteration of that data which exceeds this preselected limit may be utilized to place computer 10 within a default or lockout mode, prohibiting further attempts to modify the functional characteristics of the computer. Additionally, a log area is preferably provided within EEPROM 52 and EEPROM 54, which may be utilized to store various data entered therein without requiring unique identification codes. For example, various maintenance and modification data may be stored therein. Upon reference to the foregoing those skilled in the art will appreciate that the method and system described herein will permit a manufacturer to manufacture a computer system which includes a full set of predetermined functional characteristics and thereafter the control and security logic circuitry described herein may be utilized to selectively enable a subset of those functional characteristics for a particular application.

Figure 5:
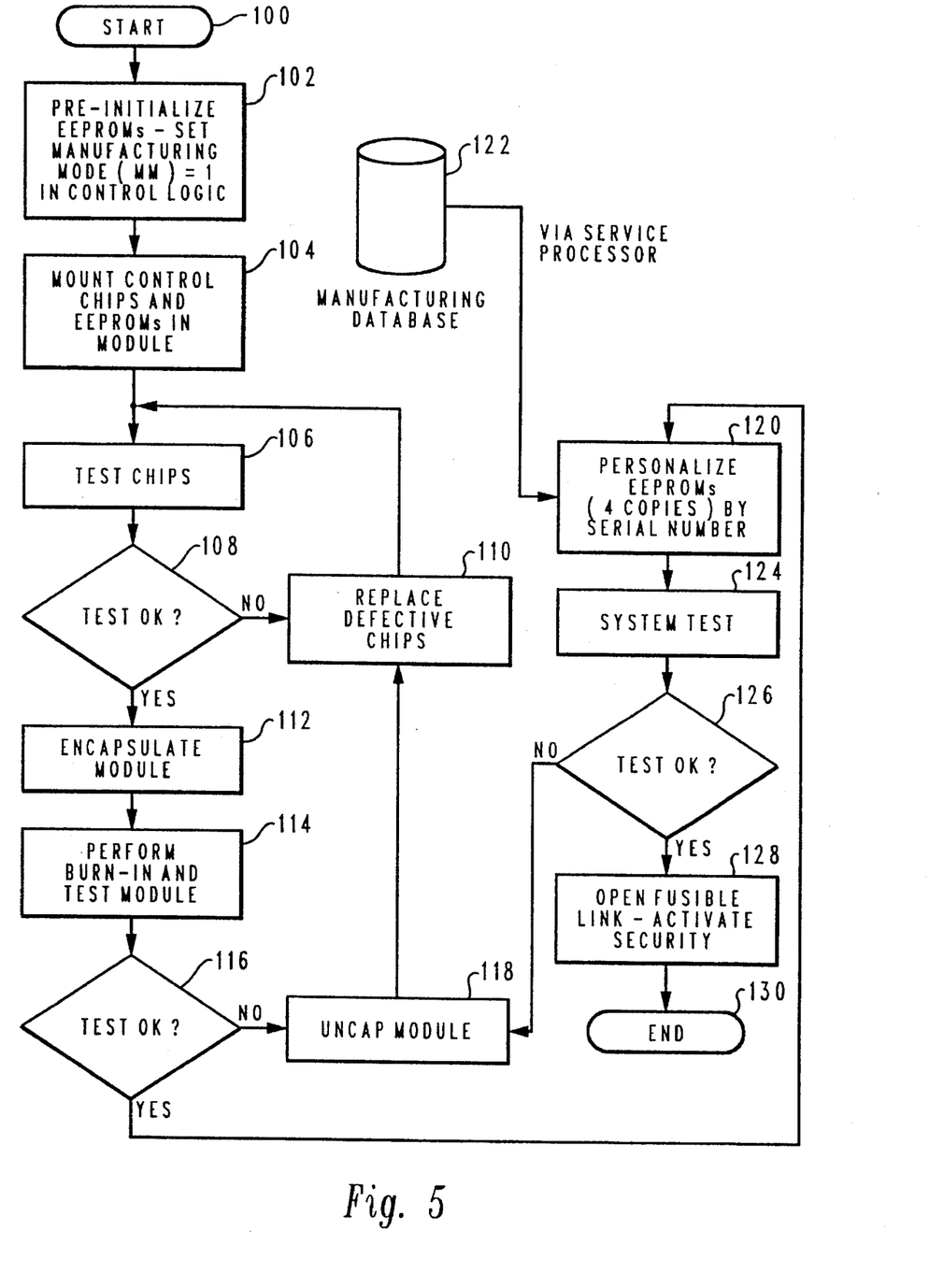
FIG. 5 is a high level logic flowchart depicting a manufacturing process for creating a data processing system which may be utilized to implement the method and system of the present invention.

With reference now to FIG. 5, there is depicted a high level logic flowchart which illustrates a manufacturing process for creating a data processing system which may be utilized to implement the method and system of the present invention. As illustrated, this process begins at block 100 and thereafter passes to block 102. Block 102 illustrates the preinitialization of the EEPROMs and the setting of the manufacturing mode (MM) bit to "1" within control logic 68 (see FIG. 4). Of course, as described above, the setting of the manufacturing mode (MM) bit to "1" within control logic 68 will not be necessary if the EEPROMs are initialized utilizing external I/O port 72 and fusible link 74, as described above. Thereafter, the process passes to block 104. Block 104 illustrates the mounting of the control chips and EEPROMs within a multichip module. While the illustrated embodiment depicted herein shows the mounting of the control and security logic chip within B module 28, those skilled in the art will appreciate that this method and system may be utilized within any multichip module within the central electronics complex, or directly within the central electronics complex in systems which do not utilize multichip modules. Next, the process passes to block 106. Block 106 illustrates the testing of the mounted chips. Thereafter, as depicted within block 108, if the mounted chips do not satisfactorily test, the process passes to block 110 which illustrates the replacing of the defective chips and the process then returns, in an iterative fashion, to block 106.

In the event the mounted control chips and EEPROMs test satisfactorily, the process passes from block 108 to block 112. Block 112 illustrates the encapsulation of the multichip module containing the control chips and EEPROMs. Those skilled in the art will appreciate that this encapsulation process may be accomplished utilizing any well known encapsulation technique which provides physical security for the integrated circuits mounted within such a module. Thereafter, the process passes to block 114. Block 114 illustrates the performing of so-called "burn-in" and the testing of the module. Next, the process passes to block 116 which illustrates a determination of whether or not the test was satisfactorily completed. If not, the process passes to block 118 which illustrates the uncapping of the multichip module and the process then returns iteratively to block 110, which depicts the replacing of the defective chips. The process then repeats until such time as the control chips and EEPROMs have been successfully mounted, burn-in has been performed and a test has been satisfactorily completed.

Still referring to block 116, in the event the test has been completed satisfactorily, the process passes to block 120. Block 120 illustrates the personalization of the EEPROM chips in association with a serial number assigned to each module. This may be accomplished via the service processor from a manufacturing database 122. Those skilled in the art will appreciate that it will be necessary to maintain, within manufacturing database 122, a record of the serial number and unique identification codes assigned to each module manufactured utilizing this technique, such that service personnel may alter the selected functional characteristics of the computer which utilizes these modules by matching the unique identification numbers stored therein during that process. Additionally, as described above, the manufacturing database may accomplish this process utilizing an external I/O port and fusible link, such as that described within FIG. 4.

After the EEPROM chips within a multichip module have been customized, the process passes to block 124. Block 124 illustrates the performance of a system test, and the process then passes to block 126. Block 126 depicts a determination of whether or not the system test was completed satisfactorily and if not, the process returns to block 118 in an iterative fashion, and proceeds as described above. Still referring to block 126, in the event the system test is concluded satisfactorily, the process passes to block 128. Block 128 illustrates the opening of the fusible link (see FIG. 4) and the activation of security within control logic 68. Thereafter, the process passes to block 130 and terminates.

Figure 6:
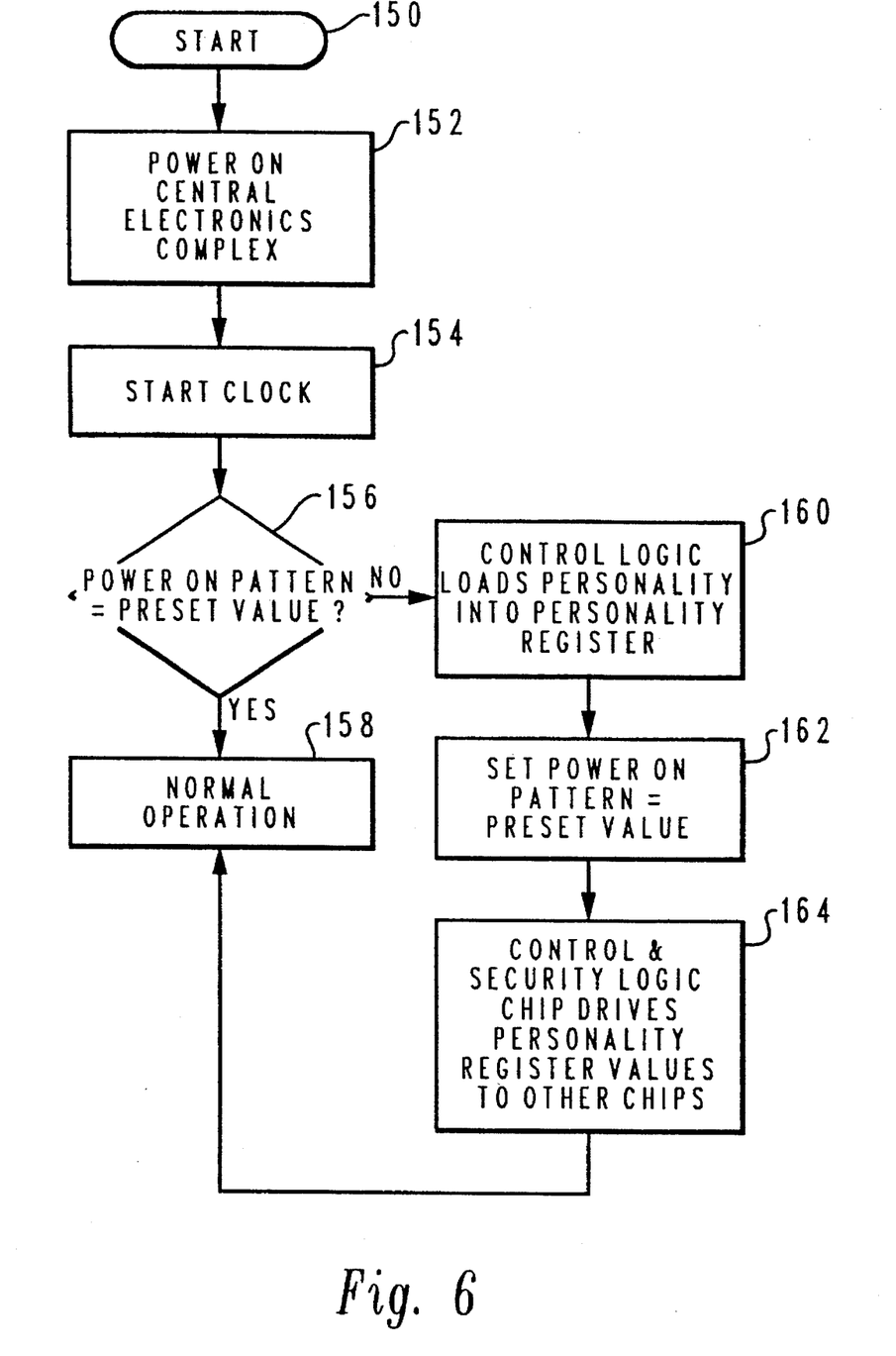
FIG. 6 is a high level logic flowchart which illustrates the enablement of selected functional characteristics within a data processing system in response to the application of electrical power, in accordance with the method and system of the present invention.

Referring now to FIG. 6, there is depicted a high level logic flowchart which illustrates the enablement of selected functional characteristics within a data processing system, in response to the application of electrical power, in accordance with the method and system of the present invention. As depicted, the process begins at block 150 and thereafter passes to block 152 which illustrates the powering on of the central electronics complex. Thereafter, the process passes to block 154 which illustrates the starting of the system clock. Next, the process passes to block 156 which illustrates a determination of whether or not a power on pattern equals a predetermined preset value. This determination is required in order to prohibit the functional characteristics of a data processing system from being altered in an unauthorized fashion by selectively removing power from the central electronics complex. If the power on pattern is equal to the predetermined preset value, the process passes to block 158, which illustrates normal operation of the data processing system.

Still referring to block 156, in the event the power on pattern does not equal the predetermined preset value, the process passes to block 160. Block 160 illustrates the loading of the personality data by control logic 68 into personality register 70 (see FIG. 4). This is accomplished by utilizing control logic 68 to read the personality data from the nonvolatile storage devices implemented utilizing EEPROM 52 and EEPROM 54. Next, the process passes to block 162. Block 162 illustrates the setting of the power on pattern to the predetermined preset value and the process then passes to block 164. Block 164 then illustrates the control and security logic chip driving the personality register values to the other chips within the module, and the process then passes to block 158 which illustrates normal operation.

Upon reference to the foregoing those skilled in the art will appreciate that by providing selected "personality" data within nonvolatile storage devices within a data processing system and accessing that data each time power is applied to the data processing system, the content of a personality register may be controlled which may then be utilized to enable and/or disable various functional characteristics of the data processing system, permitting the manufacturer to provide a variety of functional characteristic capabilities within a single data processing system, without physical or mechanical manipulation.

Figure 7A:
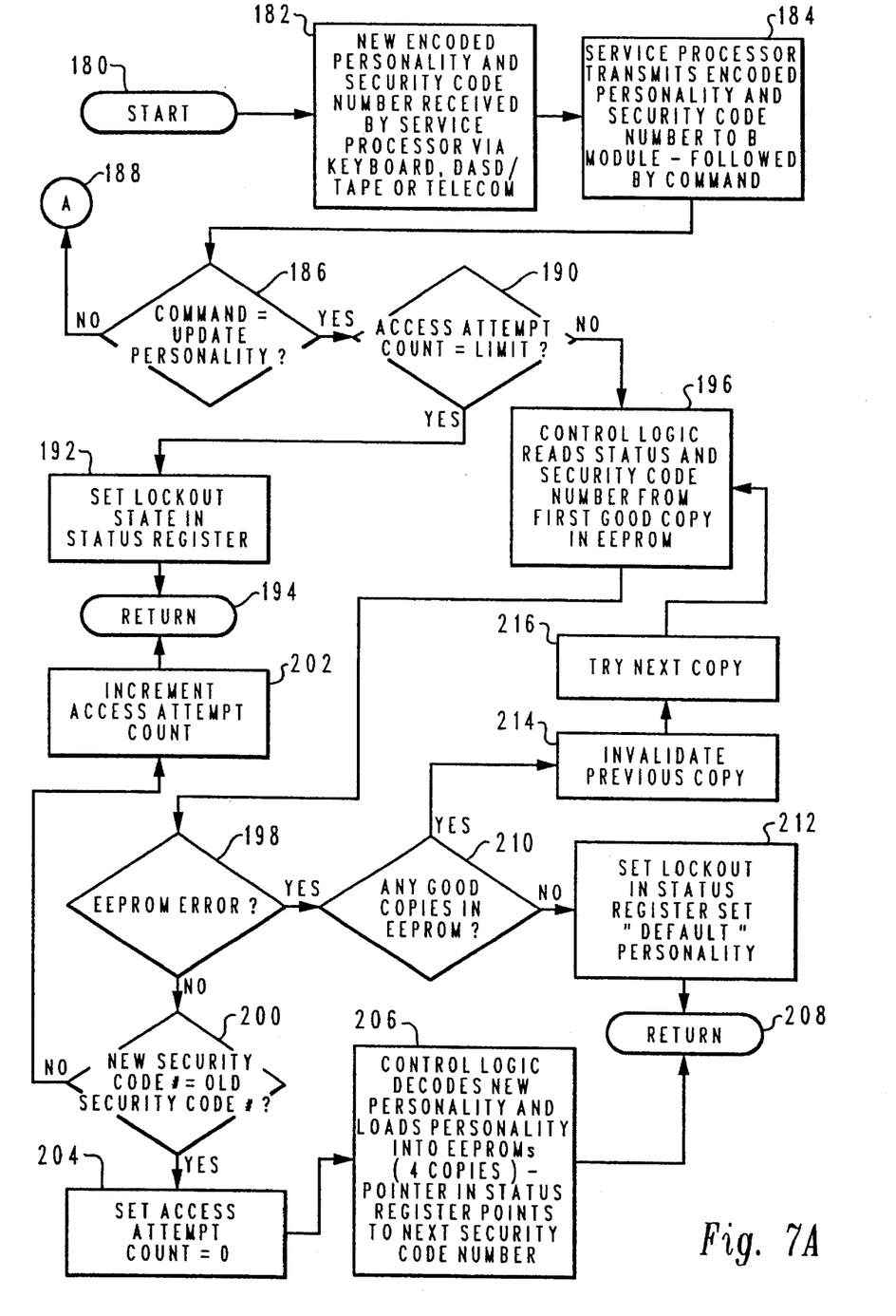
FIGS. 7a and 7b together form a high level logic flowchart which depicts the process of selectively altering the functional characteristics of a data processing system in accordance with the method and system of the present invention.
Figure 7B:
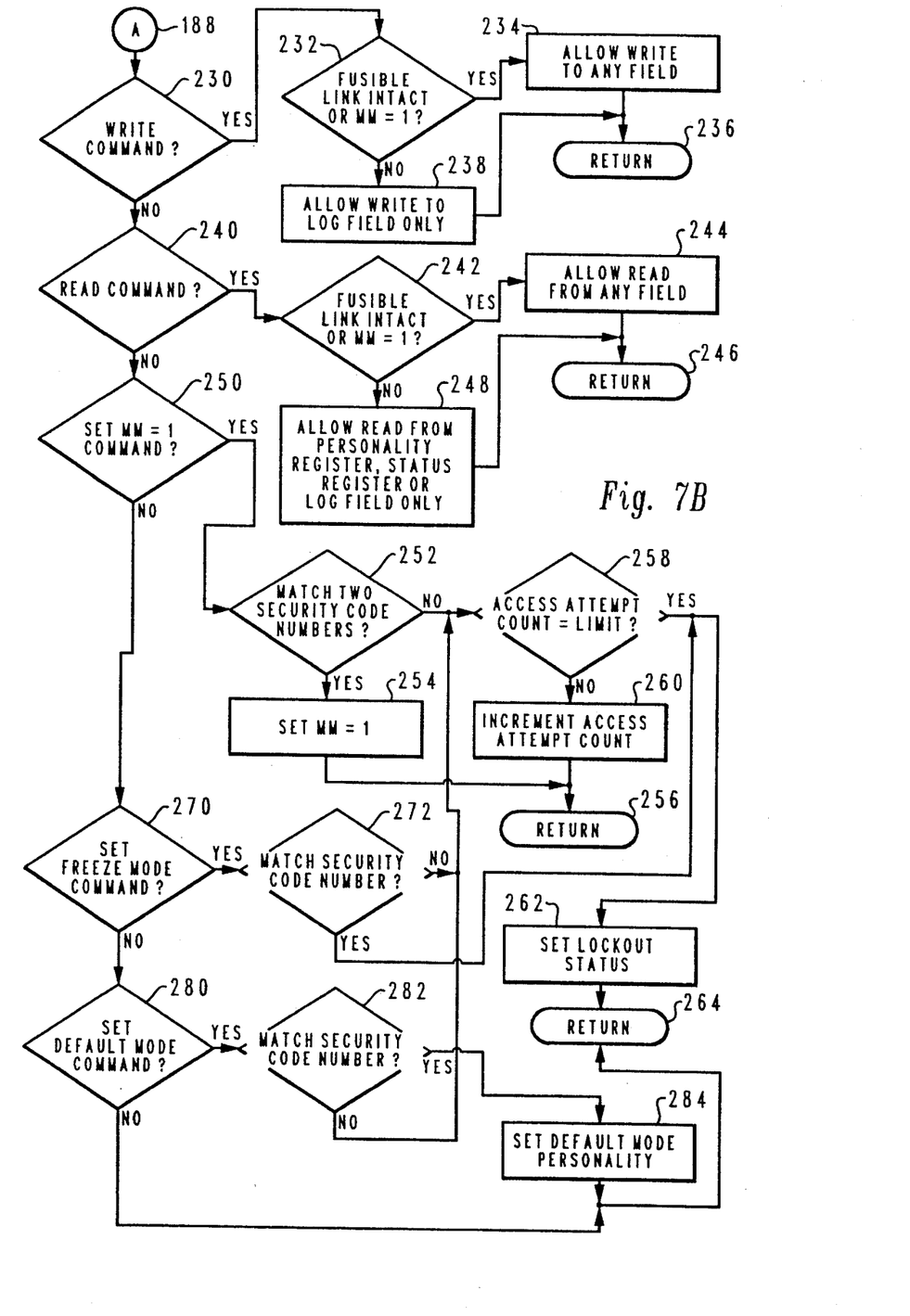

Finally, with reference to FIGS. 7a and 7b, there is depicted a high level logic flowchart which illustrates the process of selectively altering the functional characteristics of a data processing system in accordance with the method and system of the present invention. As depicted, this process begins at block 180 and thereafter passes to block 182. Block 182 illustrates the process whereby a new encoded personality and security code number is received by control logic 68 (see FIG. 4) via the keyboard, direct access storage devices or a telecommunications link. Thereafter, the process passes to block 184. Block 184 illustrates the transmission of the encoded personality and security code number to B module 28, followed by the associated command. Thereafter, block 186 illustrates a determination of whether or not the command transmitted by the service processor is a command to update the "personality," or functional characteristics of the data processing system. If not, the process passes via connector A, at reference numeral 188, to the portion of the process depicted within FIG. 7b, which will be described in greater detail below.

Still referring to block 186, in the event command transmitted by the service processor is a command to update the personality or functional characteristics of the data processing system, the process passes to block 190. Block 190 illustrates a determination of whether or not this attempt to access control logic 68 is equal to the limit of the number of access attempts permitted. If so, the process passes to block 192 which illustrates the setting of the so-called "lockout" state within the status register of control logic 68 and no further attempts to alter the functional characteristics of the data processing system will be permitted. The process then passes to block 194 and returns.

Still referring to block 190, in the event the current access attempt count does not equal the limit on such attempts, the process passes to block 196. Block 196 illustrates the reading of the status and the unique security identification code from the first good copy within the EEPROM chips. The process then passes to block 198, which illustrates a determination of whether or not an error exists within this data. If not, the process passes to block 200.

Block 200 illustrates a determination of whether or not the entered unique security identification code is equal to the existing unique security identification code. If not, the process passes to block 202 which illustrates the incrementing of the access attempt count and the process then passes to block 194 and returns. In this manner, as those skilled in the art will appreciate, an unsuccessful attempt to access the personality data within EEPROM 52 and EEPROM 54 to alter the functional characteristics of the data processing system will not be permitted if the number of attempts exceeds a predetermined small number.

Still referring to block 200, in the event the entered security identification code does match the existing unique security identification code the process passes to block 204. Block 204 illustrates the setting of the access attempt count to zero. Thereafter, the process passes to block 206. Block 206 illustrates the decoding of the new personality data and the loading of that personality data into all four copies of the multibit alterable code within the EEPROM chips. A pointer within a status register is then incremented to point to the next of the six unique security identification codes. Those having skill in this art will appreciate that the particular one of the six unique security identification codes utilized for each such update or alteration will be altered by incrementing this pointer, such that the same unique security identification code may not be utilized twice in succession. Of course, the six unique security identification codes may be reutilized after all six have been utilized by having a pointer within the status register wrap back to the first unique security identification code after the last unique security identification code has been utilized. Alternately, those skilled in the art will appreciate that the unique security identification codes described herein may be self modifying in that after all six unique security identification codes have been utilized the positions of those codes may be altered or scrambled utilizing an algorithm which may be mimicked within the manufacturing database. In yet another embodiment of the present invention a DES algorithm may be utilized to encrypt each unique security identification code in a unique manner for each operation. Thereafter, the process passes to block 208 and returns. In this manner, the subset of enabled functional characteristics within a data processing system may be electronically altered, without the necessity of physical or mechanical manipulation of the data processing system.

Referring back to block 198, in the event an error within the data in the EEPROM chip is detected, the process passes to block 210. Block 210 illustrates a determination of whether or not any "good" copies of this data remains within one of the EEPROM chips. If not, the process passes to block 212, which illustrates the setting of "lockout" in the status register and the assigning of a "default" personality to the data processing system. Thus, in the event the data within the EEPROM chips has been corrupted or is no longer available, a "default" subset of functional characteristics will be selected. Thereafter, the process passes to block 208 and returns.

Still referring to block 210, in the event a "good" copy of the data remains within an EEPROM chip, the process passes to block 214. Block 214 illustrates the invalidation of the previous copy of that data and thereafter, as depicted at block 216, the next copy of the data within one of the EEPROM chips is accessed. Thereafter, the process returns to block 196, in an iterative fashion.

Referring now specifically to FIG. 7b, in the event the command transmitted by the service processor to control logic 68 (see FIG. 4) is not an update personality command, the process passes via connector A, at reference numeral 188, to block 230. Block 230 illustrates a determination of whether or not the command transmitted from the service processor is a "write" command. If so, the process passes to block 232. Block 232 illustrates a determination of whether or not fusible link 74 is intact or the manufacturing mode bit (MM) 78 is set (see FIG. 4). If so, the process passes to block 234 which illustrates the permitting of the user to write to any field within the control and security logic. Thereafter, the process passes to block 236 and returns. Alternately, referring to block 232, in the event the fusible link is not intact or the manufacturing mode (MM) bit is not set, the process passes to block 238. Block 238 illustrates the allowing of the user to write to the log field only within the EEPROM chips. Thereafter, the process passes to block 236 and returns.

Referring again to block 230, in the event the command received is not a "write" command, the process passes to block 240. In a similar fashion to that described above, block 240 illustrates a determination of whether or the received command is a "read" command. If so, the process passes to block 242 to once again determine the status of the fusible link and the manufacturing mode bit. In the event the fusible link is intact or the manufacturing mode (MM) bit is set, the process passes to block 244, which illustrates allowing the user to read from any field within the control and security logic. Thereafter, the process passes to block 246 and returns. Still referring to block 242, in the event the fusible link is not intact or the manufacturing mode (MM) bit is not set, the process passes to block 248. Block 248 illustrates the allowing of the user to read from the personality register, status register or log fields only. In this manner a user may determine the enabled status of functional characteristics within a particular data processing system but may not access the unique security identification codes contained therein. Thereafter, the process passes to block 246 and returns.

Referring again to block 240, in the event the command transmitted by the service processor is not a "read" command, the process passes to block 250. Block 250 illustrates a determination of whether or not the command transmitted by the service processor is a command to set the manufacturing mode (MM) bit equal to "1." If so, the process passes to block 252. Block 252 illustrates a determination of whether or not the user has entered two unique security identification code numbers. Those skilled in the art will appreciate that when operating in the manufacturing mode the functional characteristics of the data processing system may be simply and easily changed. Thus, in order to set this mode of operation the method and system of the present invention requires the operator to identically match two fifty-six bit unique security identification codes which were entered into the EEPROM chips during initial loading and stored within the manufacturing database, as described above. If a match occurs with two unique security identification code numbers, as depicted at block 252, the process passes to block 254. Block 254 illustrates the setting of the manufacturing mode and the process then passes to block 256 and returns.

Still referring to block 252, in the event the user has not matched two unique security identification code numbers, the process passes to block 258. Block 258 illustrates a determination of whether or not the access attempt count is equal to the predetermined limit for such attempts. If not, the process passes to block 260 which illustrates the incrementing of the access attempt count and the process then returns, as depicted at block 256. Still referring to block 258, in the event the access attempt count is equal to the predetermined limit, the process passes to block 262. Block 262 illustrates the setting of the "lockout" status and the process then returns, as depicted at block 264.

Referring again to block 250, in the event the command transmitted from the service processor is not a command to set the manufacturing mode, the process passes to block 270. Block 270 illustrates a determination of whether or not the command transmitted by the service processor is a command to set the "freeze" mode. A "freeze" mode, as those skilled in the art will appreciate, may be utilized to lockout further attempts to access the personality data within the control and security logic circuitry such that future attempts to alter or modify the functional characteristics of the data processing system will not be permitted. In the event a "freeze" mode command is received, the process passes to block 272. Block 272 illustrates a determination of whether or not the entered unique security identification code matches the current unique security identification code. If so, the process passes to block 262, which illustrates the setting of the "lockout" status and subsequent return, as depicted at block 264. In the event the entered unique security identification code does not match the current unique security identification code, the process passes to block 258, in an iterative fashion, to determine whether or not this access attempt constitutes an attempt equal to the limit on such attempts and an incrementing of that access attempt count, if the current attempt count does not equal the limit.

Referring again to block 270, in the event the command transmitted by the service processor is not a "freeze" mode command, the process passes to block 280. Block 280 illustrates a determination of whether or not the command transmitted by the service processor is a command to set the default mode. If not, the process merely passes to block 264 and returns. However, in the event the command received is a default mode command, the process passes to block 282. Block 282 illustrates a determination of whether or not the entered unique security identification code matches the current unique security identification code and if so, the process passes to block 284 which illustrates the setting of the default mode personality. However, in the event the entered unique security identification code does not equal the current unique security identification code the process returns iteratively to block 258, to once again determine the current access attempt count and/or increment that count.

Upon reference to the foregoing those skilled in the art will appreciate that the Applicants herein have provided a novel method and system whereby a standard format data processing system may be manufactured having a selected set of functional characteristics and wherein a selected subset of that set of functional characteristics may be selectively enabled and/or altered without requiring physical or mechanical manipulation of the data processing system. In this manner, a single data processing system having a common set of parts and components may be manufactured and utilized to satisfy the requirements of numerous customers having diverse applications.

While the invention has been particularly shown and described with reference to a preferred embodiment, it will be understood by those skilled in the art that various changes in form and detail may be made therein without departing from the spirit and scope of the invention.

We claim:

1. A method for selectively electronically enabling functional capabilities of hardware elements in a data processing system, said method comprising the steps of:

providing a data processing system including a plurality of hardware elements, wherein respective ones of said hardware elements include a predetermined set of functional capabilities;

storing a multibit alterable code within a nonvolatile storage device within said data processing system, said multibit alterable code corresponding to a subset of said predetermined set of functional capabilities; and enabling said subset of said set of functional capabilities each time power is applied to said data processing system, said step of enabling being in response to a state of said multibit alterable code.

2. The method for selectively electronically enabling the functional capabilities of hardware elements in a data processing system according to claim 1, further including the step of selectively altering said multibit alterable code, wherein each multibit alterable code defines an alternate subset of said set of functional capabilities in said hardware elements which is to be enabled each time power is applied to said data processing system.

3. The method for selectively electronically enabling the functional capabilities of hardware elements in a data processing system according to claim 2, wherein said step of selectively altering said multibit alterable code occurs on a regularly scheduled basis wherein said alternate subset of said set of functional capabilities in said hardware elements is enabled on said regularly scheduled basis.

4. The method for selectively electronically enabling the functional capabilities of hardware elements in a data processing system according to claim 2, wherein said multibit alterable code includes a unique identification code and wherein said step of selectively altering said multibit alterable code comprises the step of entering an identification code and thereafter altering said multibit alterable code only in response to a match between said entered identification code and said unique identification code.

5. The method for selectively electronically enabling the functional capabilities of hardware elements in a data processing system according to claim 4, further including the step of storing said unique identification code at a central manufacturing facility.

6. The method for selectively electronically enabling the functional capabilities of hardware elements in a data processing system according to claim 1, wherein said step of storing a multibit alterable code within a nonvolatile storage device is initially accomplished via a physically alterable electronic link and wherein said method further includes the step of destroying said physically alterable electronic link after initially storing said multibit alterable code.

7. The method for selectively electronically enabling the functional capabilities of hardware elements in a data processing system according to claim 1, wherein a particular one of said predetermined set of functional capabilities in said hardware elements comprises a valid memory address range within memory within said data processing system and wherein a user of said data processing system is limited to access within said valid memory address range in response to enabling of said particular one of said predetermined set of functional capabilities in said hardware elements.

8. A system for selectively electronically enabling functional capabilities of hardware elements in a data processing system, wherein respective ones of said hardware elements include a predetermined set of functional capabilities, said system comprising:

a nonvolatile storage device, said nonvolatile storage device being mounted within said data processing system;

memory means within said nonvolatile storage device for storing a multibit alterable code; and control means for enabling a selected subset of said set of functional capabilities each time power is applied to said data processing system in response to a state of said multibit alterable code.

9. The system for selectively electronically enabling the functional capabilities of hardware elements in a data processing system according to claim 8, further including means for selectively altering said multibit alterable code, wherein each multibit alterable code defines an alternate subset of said set of functional capabilities in said hardware elements which is to be enabled each time power is applied to said data processing system.

10. The system for selectively electronically enabling the functional capabilities of hardware elements in a data processing system according to claim 9, wherein said multibit alterable code includes a unique identification code and wherein said means for selectively altering said multibit alterable code comprises means for entering an identification code and thereafter altering said multibit alterable code only in response to a match between said entered identification code and said unique identification code.

11. The system for selectively electronically enabling the functional capabilities of hardware elements in a data processing system according to claim 10, further including means for storing said unique identification code at a central manufacturing facility.

12. The system for selectively electronically enabling the functional capabilities of hardware elements in a data processing system according to claim 8, wherein a particular one of said predetermined set of functional capabilities in said hardware elements comprises a valid memory address range within memory within said data processing system and wherein said system further includes means for limiting a user of said data processing system to access within said valid memory address range in response to enabling of said particular one of said predetermined set of capabilities in said hardware elements.

13. A control module for selectively electronically enabling functional capabilities of hardware elements in a data processing system, wherein respective ones of said hardware elements are manufactured with a predetermined set of functional capabilities, said control module comprising:

a nonvolatile storage device, said nonvolatile storage device being mounted within said data processing system;

memory means within said nonvolatile storage device for storing a multibit alterable code; and control means within said control module for enabling a selected subset of said set of functional capabilities each time power is applied to said data processing system in response to a state of said multibit alterable code.

14. The control module for selectively electronically enabling the functional capabilities of hardware elements in a data processing system according to claim 13, further including a physically alterable electronic link for initially loading said multibit alterable code within said nonvolatile storage device.

* * * * *